United States Patent
Sugiyama et al.

(10) Patent No.: US 10,527,826 B2
(45) Date of Patent: Jan. 7, 2020

(54) WIDE-ANGLE LENS AND IMAGING DEVICE

(71) Applicant: MAXELL, LTD., Kyoto (JP)

(72) Inventors: Takashi Sugiyama, Osaka (JP); Masaki Yamazaki, Osaka (JP)

(73) Assignee: MAXELL, LTD., Kyoto (JP)

( * ) Notice: Subject to any disclaimer, the term of this patent is extended or adjusted under 35 U.S.C. 154(b) by 701 days.

(21) Appl. No.: 14/371,944

(22) PCT Filed: Feb. 22, 2013

(86) PCT No.: PCT/JP2013/001035
§ 371 (c)(1),
(2) Date: Jul. 11, 2014

(87) PCT Pub. No.: WO2013/125248
PCT Pub. Date: Aug. 29, 2013

(65) Prior Publication Data
US 2015/0049166 A1 Feb. 19, 2015

(30) Foreign Application Priority Data
Feb. 24, 2012 (JP) ................................. 2012-039330

(51) Int. Cl.
*G02B 9/12* (2006.01)
*G02B 9/34* (2006.01)
(Continued)

(52) U.S. Cl.
CPC ............. *G02B 13/04* (2013.01); *G02B 13/18* (2013.01); *G03B 13/32* (2013.01); *H04N 5/23238* (2013.01)

(58) Field of Classification Search
CPC ...... G02B 13/04; G02B 13/004; G02B 13/06; G02B 13/18; G02B 15/117; G02B 15/173; G03B 13/32; H04N 5/23238
See application file for complete search history.

(56) References Cited

U.S. PATENT DOCUMENTS 5,774,279 A * 6/1998 Kiriki ................. G02B 13/04
359/708
6,671,103 B2 * 12/2003 Itoh ..................... G02B 15/177
359/676
(Continued)

FOREIGN PATENT DOCUMENTS

CN 201984202 U 9/2011
JP A-2-208617 8/1990
(Continued)

OTHER PUBLICATIONS

May 21, 2013 International Search Report issued in International Application No. PCT/JP2013/001035.

*Primary Examiner* — Jamie J Atala
*Assistant Examiner* — Patrick E Demosky
(74) *Attorney, Agent, or Firm* — Oliff PLC

(57) ABSTRACT

An imaging lens is formed from a first group lens having negative power, a second group lens having positive power, a third group lens having negative power, and a fourth group lens having positive power, disposed in order from the subject side to the image side. Letting f be the focal distance for the entire lens system and ff2 the focal distance for the second group lens, $1.0 \leq ff2/f \leq 2.0$ is satisfied; therefore, the entire length of the lens system can be kept short and image curvature can be suppressed. In addition, each of the subject side lens surfaces and the image side lens surfaces for the second group lens, third group lens, and fourth group lens are provided with aspherical surface shapes; therefore, the imaging lens is constituted to be bright.

4 Claims, 21 Drawing Sheets

(51) Int. Cl.
*G02B 13/04* (2006.01)
*G02B 13/18* (2006.01)
*G03B 13/32* (2006.01)
*H04N 5/232* (2006.01)

(56) References Cited

U.S. PATENT DOCUMENTS

| | | |
|---|---|---|
| 6,747,816 B2 | 6/2004 | Sato |
| 7,379,252 B2 | 5/2008 | Murayama |
| 8,179,616 B1* | 5/2012 | Hsu .................. G02B 9/34 359/715 |
| 9,057,868 B1* | 6/2015 | Chung ............... G02B 13/0045 |
| 2002/0196564 A1* | 12/2002 | Sato .................. G02B 9/34 359/753 |
| 2007/0217035 A1* | 9/2007 | Baba ................. G02B 9/60 359/793 |
| 2008/0144193 A1* | 6/2008 | Adachi ............... G02B 9/60 359/770 |
| 2009/0052053 A1* | 2/2009 | Iyama ................ G02B 15/177 359/691 |
| 2011/0096221 A1* | 4/2011 | Tsai .................. G02B 13/0035 348/340 |
| 2012/0026285 A1 | 2/2012 | Yoshida et al. |
| 2012/0087017 A1* | 4/2012 | Fujisaki .............. G02B 13/009 359/687 |
| 2015/0049166 A1* | 2/2015 | Sugiyama ............ G02B 13/04 348/36 |

FOREIGN PATENT DOCUMENTS

| | | |
|---|---|---|
| JP | A-9-222558 | 8/1997 |
| JP | A-11-95094 | 4/1999 |
| JP | A-2002-296498 | 10/2002 |
| JP | A-2006-276779 | 10/2006 |
| JP | A-2006-349920 | 12/2006 |
| JP | A-2007-249073 | 9/2007 |
| JP | A-2007-279632 | 10/2007 |
| JP | A-2007-333966 | 12/2007 |
| JP | A-2009-14947 | 1/2009 |
| JP | A-2010-243709 | 10/2010 |

* cited by examiner

WIDE-ANGLE LENS AND IMAGING DEVICE

TECHNICAL FIELD

The present invention relates to a small-sized and high-resolution wide-angle lens comprising four to six lenses, and an imaging device equipped with the wide-angle lens.

BACKGROUND ART

Patent Document 1 discloses a wide-angle lens mounted on a device such as an on-vehicle camera or surveillance camera. The disclosed wide-angle lens comprises a first lens provided with negative power, a second lens provided with positive power, a third lens provided with negative power, and a fourth lens provided with positive power arranged in the stated order from an object side to an image side. The disclosed wide-angle lens has a diagonal angle of view of about 65°.

PRIOR ART DOCUMENT

Patent Document

Patent Document 1: JP 2009-14947 A

SUMMARY OF THE INVENTION

Problems to be Solved by the Invention

It is demanded that a wide-angle lens mounted in an imaging device, such as an on-vehicle camera or surveillance camera, be small-sized and have higher resolution associated with the increasing number of pixels of image pick-up devices mounted in such imaging devices. Aberration, such as curvature of field, must be restrained more than previously to improve the resolution of a wide-angled lens.

With the foregoing in view, an object of the present invention is to provide a small-sized and more high-resolution wide-angle lens, and an imaging device equipped with such a wide-angle lens.

Means to Solve the Problems

To solve the problems, the wide-angle lens of the present invention is characterized in comprising:

a first group lens having negative power, a second group lens having positive power, a third group lens having negative power, and a fourth group lens having positive power arranged in the stated order from an object side toward an image side;

the first group lens comprising one lens having negative power or two lenses both having negative power;

the second group lens comprising one lens having positive power or two lenses both having positive power;

the third group lens comprising one lens having negative power; and the fourth group lens comprising one lens having positive power, wherein the lens constituting the first group lens is provided with a concave shape for the lens surface on the image side;

the lens in the second group lens arranged adjacent to the third group lens is provided with a convex shape for the lens surface on the image side;

the third group lens is provided with a concave shape for the lens surface on the object side;

at least one of the lenses constituting the second group lens, the third group lens, and the fourth group lens is made to have an aspherical shape for at least one lens surface among the lens surface on the object side and the lens surface on the image side; and the following conditional expression (1) is satisfied, $$1.0 \leq f2/f \leq 2.0 \quad (1)$$

where f is the focal length of the entire lens system, and ff2 is the focal length of the second group lens.

Because the wide-angle lens of the present invention satisfies the conditional expression (1), the total length of the lens system can be kept short, and curvature of field can be restrained. Providing the lenses constituting the second group lens, the third group lens, and the fourth group lens with an aspherical shape facilitates enlarging the aperture ratio. At greater than the upper limit of the conditional expression (1), curvature of field increases on the positive side and becomes difficult to correct. At less than the lower limit of the conditional expression (1), curvature of field increases on the negative side and becomes difficult to correct. Also at greater than the upper limit of the conditional expression (1), the positive power of the second group lens becomes weaker, making it difficult to keep the total length of the lens system short. A "wide-angle lens" refers to an imaging lens having a diagonal angle of view of 60° or greater.

The following conditional expression (2) is preferably satisfied in the present invention, where ff3 is the focal length of the third group lens.

$$-2.0 \leq f2/f3 \leq -1.0 \quad (2)$$

The upper limit of the conditional expression (2) is for restraining chromatic aberration. At greater than the upper limit of the conditional expression (2), the negative power of the third group lens provided with a concave shape becomes excessively weaker than the positive power of the second group lens provided with a convex shape, which increases chromatic aberration, making it difficult to correct. Therefore, the upper limit is made −1.0 or less to restrain chromatic aberration. The lower limit of the conditional expression (2) is for restraining curvature of field and keeping the total length of the lens system short. At less than the lower limit of the conditional expression (2), the negative power of the third group lens provided with a concave shape becomes excessively stronger than the positive power of the second group lens provided with a convex shape, which leads to an increase in curvature of field. Therefore, the lower limit is made −2.0 or greater to restrain curvature of field. Also at less than the lower limit of the conditional expression (2), the positive power of the second group lens becomes weaker than the negative power of the third group lens, making it difficult to keep the total length of the lens system short. Setting the range of the conditional expression (2) to −1.9 to −1.3 can produce a balance between chromatic aberration and curvature of field.

The following conditional expression (3) is preferably satisfied in the present invention, where ff4 is the focal length of the fourth group lens.

$$0.5 \leq f4/f \leq 2.0 \quad (3)$$

The conditional expression (3) is for restraining curvature of field. Specifically, at greater than the upper limit of the conditional expression (3), curvature of field increases on the positive side and becomes difficult to correct. At less than the lower limit of the conditional expression (3), curvature of field increases on the negative side and becomes difficult to correct. Therefore, this range is made 0.5 to 2.0 to better restrain curvature of field. Setting the range of the conditional expression (3) to 0.7 to 1.7 produces a balance with the image surface.

To correct chromatic aberration well in the present invention, the second group lens is preferably provided with a lens having an Abbe number of 40 or greater, and the third group lens is preferably provided with a lens having an Abbe number of 35 or less.

A configuration having a diagonal angle of view of 100° or greater may be employed in the present invention. That is, curvature of field can be restrained even in a wide-angle lens having such a large angle of view.

Next, an imaging device of the present invention is characterized in having the wide-angle lens, and an image pick-up device arranged in a focal position of the wide-angle lens.

According to the present invention, because the wide-angle lens has high resolution, an image pick-up device having a large pixel number can be employed as an image pick-up device, and the imaging device can be high resolution. Because the total length of the wide-angle lens can be shortened, the imaging device can be made small.

Effect of the Invention

According to the wide-angle lens of the present invention, the total length of the lens system can be kept short, and curvature of field can be restrained. Enlarging the aperture ratio is also facilitated.

MODE FOR CARRYING OUT THE INVENTION

An imaging lens to which the present invention is applied will be described hereinafter with reference to the appended drawings.

Example 1

Figure 1:
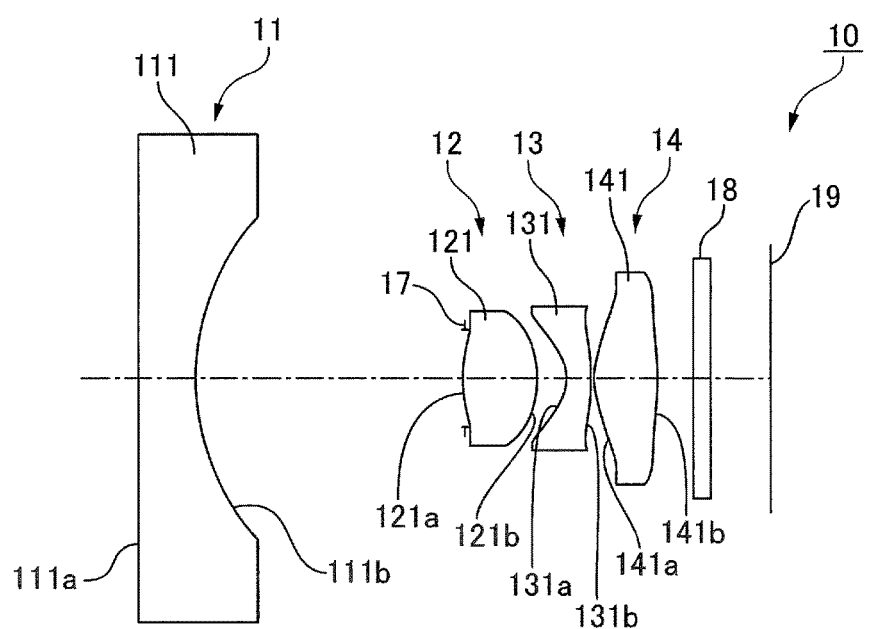
FIG. 1 is a block diagram of an imaging lens of Example 1 to which the present invention is applied.

FIG. 1 is a block diagram of the imaging lens of Example 1. As shown in FIG. 1, an imaging lens 10 comprises a first group lens 11 having negative power, a second group lens 12 having positive power, a third group lens 13 having negative power, and a fourth group lens 14 having positive power arranged in the stated order from the object side toward the image side. The imaging lens 10 of the present example has a configuration comprising four lenses, in which the first group lens 11 comprises one first lens 111, the second group lens 12 comprises one second lens 121, the third group lens 13 comprises one third lens 131, and the fourth group lens 14 comprises one fourth lens 141. A diaphragm 17 is arranged between the first group lens 11 and the second group lens 12; that is, between the first lens 111 and the second lens 121. A cover glass 18 is arranged on the image side of the fourth lens 141. The image plane 19 is positioned with a gap between the image plane 19 and the cover glass 18.

The first lens 111 is provided with a planar shape for the lens surface on the object side 111a, and a concave shape for the lens surface on the image side 111b. The second lens 121 is provided with a convex shape for both the lens surface on the object side 121a and the lens surface on the image side 121b. The third lens 131 is provided with a concave shape for the lens surface on the object side 131a, and a convex shape for the lens surface on the image side 131b. The fourth lens 141 is provided with a convex shape for both the lens surface on the object side 141a and the lens surface on the image side 141b.

Where Fno. is the numerical aperture of the imaging lens 10, ω is the half angle view, and L is the total length of the lens system, these values are as follows.

Fno.=2
ω=57.5°
L=12.303 mm

Where f is the focal length of the entire lens system, ff1 is the focal length of the first group lens 11 (the first lens 111), ff2 is the focal length of the second group lens 12 (the second lens 121), ff3 is the focal length of the third group lens 13 (the third lens 131), and ff4 is the focal length of the fourth group lens 14 (the fourth lens 141), these values are as follows.

f=1.9748
ff1=−7.394
ff2=2.019
ff3=−1.089
ff4=1.545

The imaging lens 10 of the present example satisfies the following conditional expressions (1)-(3).

$$1.0 \leq ff2/f \leq 2.0 \quad (1)$$

$$-2.0 \leq ff2/ff3 \leq -1.0 \quad (2)$$

$$0.5 \leq ff4/f \leq 2.0 \quad (3)$$

That is, ff2/f=1.02, ff2/ff3=−1.85, and ff4/f=0.78.

Because the imaging lens 10 of the present example satisfies the conditional expression (1), the total length of the lens system can be kept short, and curvature of field can be restrained. Specifically, at greater than the upper limit of the conditional expression (1), curvature of field increases on the positive side and becomes difficult to correct. At less than the lower limit of the conditional expression (1), curvature of field increases on the negative side and becomes difficult to correct. Also at greater than the upper limit of the conditional expression (1), the positive power of the second group lens 12 is weaker, making it difficult to keep the total length of the lens system short.

Because the imaging lens 10 satisfies the conditional expression (2), the total length of the lens system can be kept short, and curvature of field can be restrained while restraining chromatic aberration. Specifically, at greater than the upper limit of the conditional expression (2), the negative power of the third group lens provided with a concave shape 131 becomes excessively weaker than the positive power of the second group lens provided with a convex shape 12, increasing chromatic aberration and making it difficult to correct. Therefore, the upper limit is made −1.0 or less to restrain chromatic aberration. The lower limit of the conditional expression (2) is for restraining curvature of field and keeping the total length of the lens system short. At less than the lower limit of the conditional expression (2), the negative power of the third group lens provided with a concave shape 131 becomes excessively stronger than the positive power of the second group lens provided with a convex shape 12, leading to an increase in curvature of field. Therefore, the lower limit is made −2.0 or greater to restrain curvature of field. At less than the lower limit of the conditional expression (2), the positive power of the second group lens 12 becomes weaker than the negative power of the third group lens 13, making it difficult to keep the total length of the lens system short. Setting the range of the conditional expression (2) to −1.9 to −1.3 can produce a balance between chromatic aberration and curvature of field.

Because the imaging lens 10 satisfies the conditional expression (3), curvature of field can be better restrained. Specifically, at greater than the upper limit of the conditional expression (3), curvature of field increases on the positive side and becomes difficult to correct. At less than the lower limit of the conditional expression (3), curvature of field increases on the negative side and becomes difficult to correct. Therefore, this range is made 0.5 to 2.0 to better restrain curvature of field. Setting the range of the conditional expression (3) to 0.7 to 1.7 can produce a balance with the image surface.

The following conditional expressions (4) and (5) are satisfied in the present example, where vd2 is the Abbe number of the second group lens 12 (the second lens 121) and vd3 is the Abbe number of the third group lens 13 (the third lens 131).

$$vd2 \geq 40 \quad (4)$$

$$vd3 \leq 35 \quad (5)$$

In the present example, vd2=52 and vd3=23.4. As a result, chromatic aberration can be corrected well with the imaging lens 10 because the second lens 121 comprising a material of low dispersion is arranged adjacent to the third lens 131 comprising a material of high dispersion.

Next, Table 1A shows lens data of the lens surfaces of the imaging lens 10. Table 1A specifies the lens surfaces in order counting from the object side. Lens surfaces marked with asterisks are aspherical surfaces. In the present example, the lens surfaces on the object side 121a, 131a, and 141a and the lens surfaces on the image side 121b, 131b, and 141b of the second lens 121 (the second group lens 12), the third lens 131 (the third group lens 13), and the fourth lens 141 (the fourth group lens 14) are provided with aspherical shapes. S indicates the diaphragm 17. The 9th and 10th surfaces are glass surfaces of the cover glass 18. The unit for the radius of curvature and the gap is millimeters.

TABLE 1A

| Surface No. | Radius of curvature | Gap | Nd (refractive index) | Vd (Abbe number) |
|---|---|---|---|---|
| 1st surface | Infinity | 1.000 | 1.15168 | 64.2 |
| 2nd surface | 3.835 | 4.726 | | |
| 3rd surface S | Infinity | −0.036 | | |
| 4th surface * | 2.106 | 1.279 | 1.5346 | 56.0 |
| 5th surface * | −1.760 | 0.513 | | |
| 6th surface * | −0.633 | 0.431 | 1.6319 | 23.4 |
| 7th surface * | −8.915 | 0.057 | | |
| 8th surface * | 0.949 | 1.108 | 1.5346 | 56.0 |
| 9th surface * | −3.890 | 0.631 | | |
| 10th surface | Infinity | 0.300 | 1.5168 | 64.2 |
| 11th surface | Infinity | 0.872 | | |

Next, Table 1B indicates aspherical coefficients for prescribing the aspherical shape of a lens surface made to have an aspherical shape. Table 1B likewise specifies the lens surfaces in order counting from the object side.

TABLE 1B

| | Fourth Surface | Fifth Surface | Sixth Surface | Seventh Surface | Eighth Surface | Ninth Surface |
|---|---|---|---|---|---|---|
| K | −27.28282 | 1.00817 | −2.355196 | 50.90771 | −11.43756 | −4.732964 |
| A4 | 2.89094E−01 | −4.91304E−02 | −2.41659E−01 | −5.11864E−01 | 8.08884E−03 | 9.15869E−02 |
| A6 | −6.15595E−01 | 5.14099E−02 | 3.16267E−01 | 1.43965E+00 | 4.3844E−02 | −6.14929E−02 |
| A8 | 7.23663E−01 | −6.30732E−02 | 1.31348E−01 | −2.05869E+00 | −5.83106E−02 | 3.51186E−02 |
| A10 | −4.60752E−01 | 2.37616E−02 | −8.28993E−01 | 1.78101E+00 | 3.22554E−02 | −1.26469E−02 |
| A12 | 0.00000E+00 | 0.00000E+00 | 8.33710E−01 | −8.46702E−01 | −7.77033E−03 | 1.74905E−03 |
| A14 | 0.00000E+00 | 0.00000E+00 | −2.59305E−01 | 1.71228E−01 | −1.21963E−04 | 2.83005E−05 |
| A16 | 0.00000E+00 | 0.00000E+00 | 0.00000E+00 | 0.00000E+00 | 2.25513E−04 | −2.22343E−05 |

The aspherical shape employed for a lens surface is expressed by the following formula, where Y is the sag, c is the inverse of the radius of curvature, K is the constant of the cone, h is the ray height, and A4 is the fourth-order, A6 the sixth-order, A8 the eighth-order, A10 the tenth-order, A12 the twelfth-order, A14 the fourteenth-order, and A16 the sixteenth-order aspherical coefficient.

$$Y(h) = \frac{ch^2}{1+\sqrt{1-(K+1)c^2h^2}} + A_4h^4 + A_6h^6 + A_8h^8 + A_{10}h^{10} + A_{12}h^{12} + A_{14}h^{14} + A_{16}h^{16} \quad \text{NUMERICAL EXPRESSION 1}$$

[Effects]

Figure 2A:
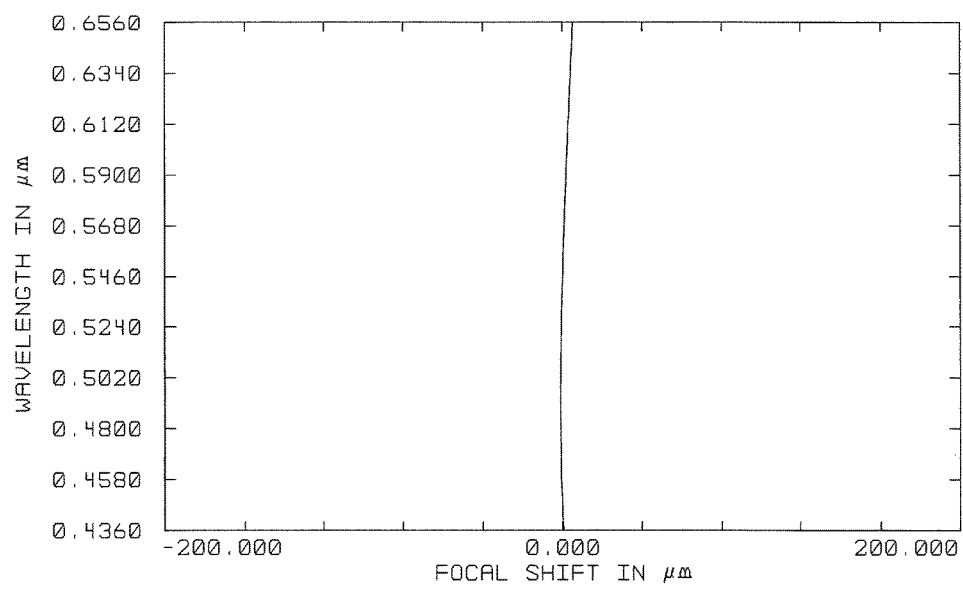
FIG. 2A is an axial chromatic aberration diagram of the imaging lens of FIG. 1.
Figure 2B:
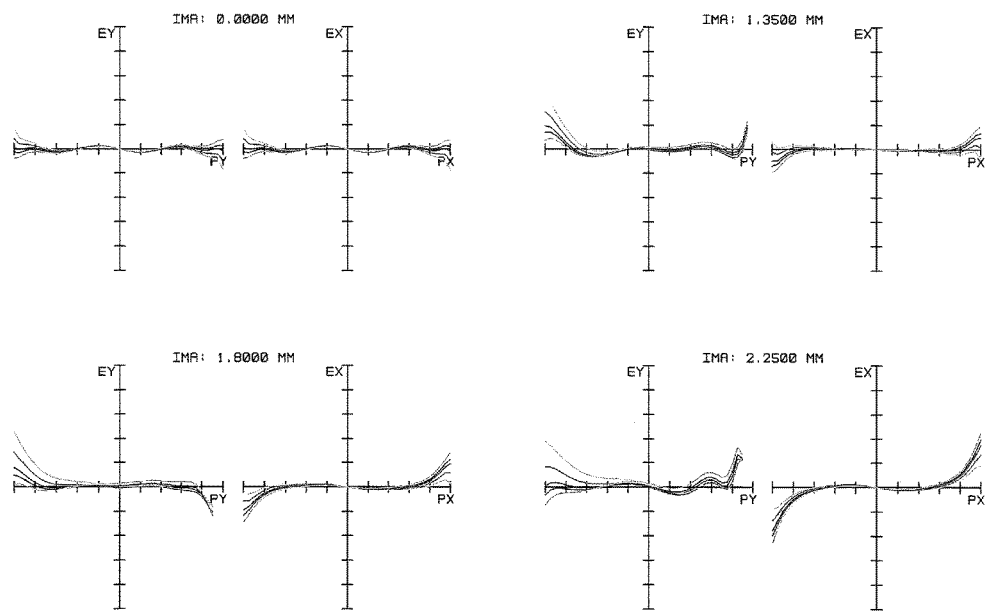
FIG. 2B is a lateral aberration diagram of the imaging lens of FIG. 1.
Figure 2C:
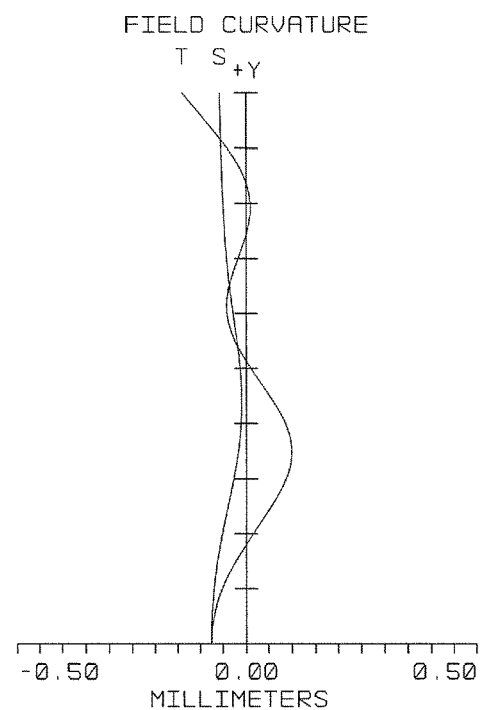
FIG. 2C is a curvature of field diagram of the imaging lens of FIG. 1.
Figure 2D:
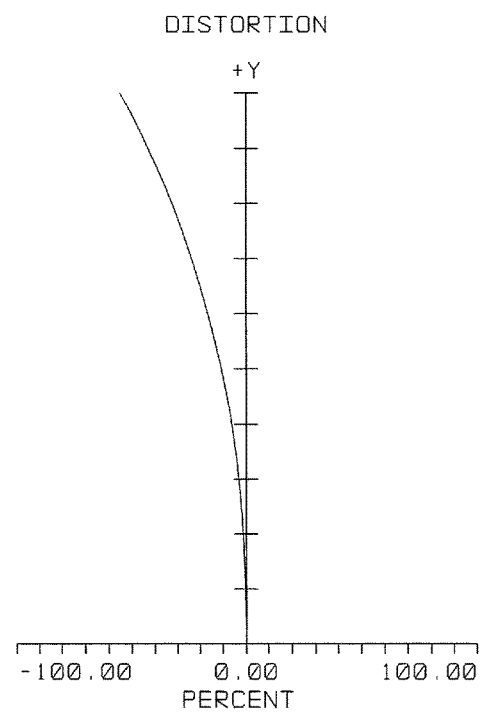
FIG. 2D is a distortion aberration diagram the imaging lens of FIG. 1.

FIG. 2A-2D are an axial chromatic aberration diagram, a lateral aberration diagram, a curvature of field diagram, and a distortion aberration diagram of the imaging lens 10. The axial chromatic aberration diagram of FIG. 2A shows focal shift, and shows the wavelength on the vertical axis. The lateral aberration diagram of FIG. 2B shows the coordinates of the entrance pupil on the horizontal axis, and the degree of aberration on the vertical axis. FIG. 2B shows the results of a simulation carried out for a plurality of rays of different wavelengths. The curvature of field diagram of FIG. 2C shows distance in the optical axis direction on the horizontal axis, and the height of the image on the vertical axis. In FIG. 2C, S indicates curvature of field aberration in the sagittal plane, and T indicates curvature of field aberration in the tangential plane. The distortion aberration diagram of FIG. 2D shows the degree of strain of the image on the horizontal axis, and the height of the image on the vertical axis. As shown in FIG. 2A, axial chromatic aberration is corrected well according to the imaging lens 10 of the present example. As shown in FIG. 2B, color bleeding is restrained. As shown in FIGS. 2C and 2D, curvature of field is corrected well. Therefore, the imaging lens 10 has high resolution.

Because the second lens 121 (the second group lens 12), the third lens 131 (the third group lens 13), the fourth lens 141 (the fourth group lens 14) are provided with aspherical shapes for the lens surfaces on the object side 121a, 131a, and 141a and the lens surfaces on the image side 121b, 131b, and 141b in the present example, the imaging lens 10 takes on a bright configuration. The total length of the lens system L can also be restrained to a short 12.303 mm in the present example.

Example 2

Figure 3:
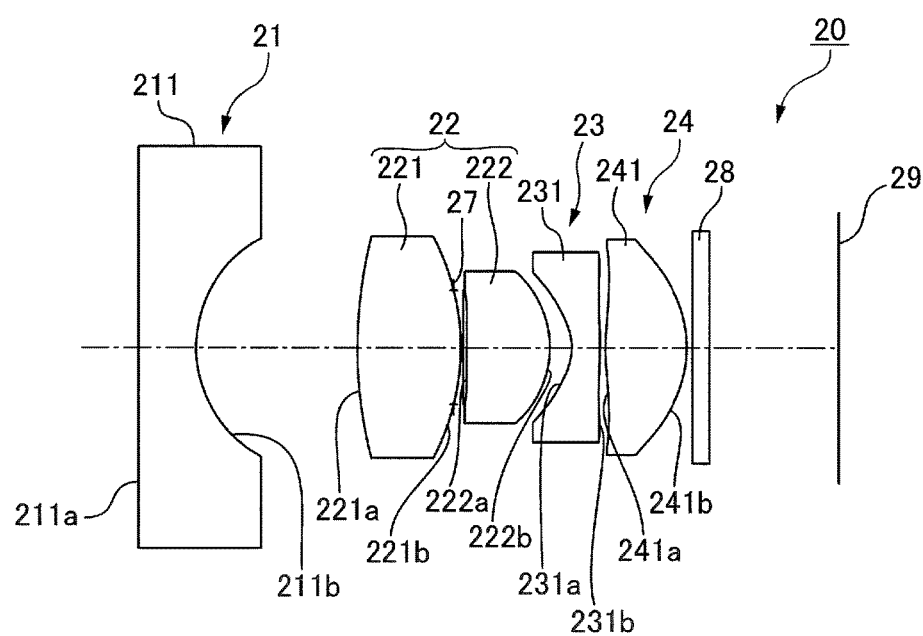
FIG. 3 is block diagram of an imaging lens of Example 2 to which the present invention is applied.

FIG. 3 is a block diagram of the imaging lens 20 of Example 2. As shown in FIG. 3, the imaging lens 20 comprises a first group lens 21 having negative power, a second group lens 22 having positive power, a third group lens 23 having negative power, and a fourth group lens 24 having positive power arranged in the stated order from the object side toward the image side. The imaging lens 20 of the present example has a configuration comprising five lenses, where the first group lens 21 comprises one first lens 211, the second group lens 22 comprises two lenses of a second lens 221 and a third lens 222, a third group lens 23 comprises one fourth lens 231, and a fourth group lens 24 comprises one fifth lens 241. A diaphragm 27 is arranged between the second lens 221 and third lens 222 in the second group lens 22. A cover glass 28 is arranged on the image side of the fifth lens 241. The image plane 29 is positioned with a gap between the image plane 29 and the cover glass 28.

The first lens 211 is provided with a planar shape for the lens surface on the object side 211a, and a concave shape for the lens surface on the image side 211b. The second lens 221 is provided with a convex shape for both the lens surface on the object side 221a and the lens surface on the image side 221b. The third lens 222 is provided with a convex shape for both the lens surface on the object side 222a and the lens surface on the image side 222b. The fourth lens 231 is provided with a concave shape for the lens surface on the object side 231a, and a convex shape for the lens surface on the image side 231b. The fifth lens 241 is provided with a convex shape for both the lens surface on the object side 241a and the lens surface on the image side 241b.

Where Fno. is the numerical aperture of the imaging lens 20, $\omega$ is the half angle view, and L is the total length of the lens system, these values are as follows.

Fno.=2
$\omega$=69.0°
L=12.300 mm

Where f is the focal length of the entire lens system, ff1 is the focal length of the first group lens 21 (the first lens 221), ff2 is the focal length of the second group lens 22 (the second lens 221 and the third lens 222), ff3 is the focal length of the third group lens 23 (the fourth lens 231), and ff4 is the focal length of the fourth group lens 24 (the fifth lens 241), these values are as follows.

f=1.9055
ff1=−3.430
ff2=2.059
ff3=−1.481
ff4=2.451

Where ff21 is the focal length of the second lens 221 comprising the second group lens 22, and ff22 is the focal length of the third lens 222, these values are as follows.

ff21=4.080
ff22=2.685

The imaging lens 20 of the present examples satisfies the following conditional expressions (1)-(3).

$$1.0 \leq ff2/f=1.08 \leq 2.0 \quad (1)$$

$$-2.0 \leq ff2/ff3=-1.39 \leq -1.0 \quad (2)$$

$$0.5 \leq ff4/f=1.29 \leq 2.0 \quad (3)$$

The following conditional expressions (4) and (5) are satisfied in the present example, where vd2 is the Abbe number of the third lens 222, which has the higher Abbe number of the second lens 221 and the third lens 222 comprising the second group lens 22, and vd3 the Abbe number of the third group lens 23 (the fourth lens 231).

$$vd2=56 \geq 40 \quad (4)$$

$$vd3=23.4 \leq 35 \quad (5)$$

Next, Table 2A shows lens data of the lens surfaces of the imaging lens 20. Table 2A specifies the lens surfaces in order counting from the object side. Lens surfaces marked with asterisks are aspherical surfaces. In the present example, the lens surfaces on the object side 222a, 231a, and 241a and the lens surfaces on the image side 222b, 231b, and 241b of the third lens 222, the fourth lens 231 (the third group lens 23), and the fifth lens 241 (the fourth group lens 24) are provided with aspherical shapes. S indicates the diaphragm 27. The $12^{th}$ and $13^{th}$ surfaces are the glass surfaces of the cover glass 28. The unit for the radius of curvature and the gap is millimeters.

TABLE 2A

| Surface No. | Radius of curvature | Gap | Nd (refractive index) | Vd (Abbe number) |
|---|---|---|---|---|
| $1^{st}$ surface | Infinity | 1.005 | 1.5891 | 61.3 |
| $2^{nd}$ surface | 2.029 | 2.846 | | |
| $3^{rd}$ surface | 7.134 | 1.804 | 1.6477 | 33.8 |
| $4^{th}$ surface | −3.822 | 0.042 | | |
| $5^{th}$ surface S | Infinity | 0.058 | | |
| $6^{th}$ surface * | 44.135 | 1.471 | 1.5346 | 56.0 |
| $7^{th}$ surface * | −1.473 | 0.386 | | |
| $8^{th}$ surface * | −0.828 | 0.482 | 1.6323 | 23.4 |
| $9^{th}$ surface * | −8.142 | 0.100 | | |
| $10^{th}$ surface * | 3.144 | 1.423 | 1.5346 | 56.0 |
| $11^{th}$ surface * | −1.905 | 0.100 | | |
| $12^{th}$ surface | Infinity | 0.300 | 1.5168 | 64.2 |
| $13^{th}$ surface | Infinity | 2.207 | | |

Next, Table 2B indicates aspherical coefficients for prescribing the aspherical shape of a lens surface made to have an aspherical shape. Table 2B likewise specifies the lens surfaces in order counting from the object side.

TABLE 2B

| | Sixth Surface | Seventh Surface | Eighth Surface | Ninth Surface | Tenth Surface | Eleventh Surface |
|---|---|---|---|---|---|---|
| K   | −33.86235    | −4.524449    | −0.6534266   | 14.03202     | 2.128012     | 0 |
| A4  | −3.50474E−02 | −1.27565E−01 | 3.64349E−01  | 3.25046E−02  | −2.54735E−01 | 8.43204E−03 |
| A6  | 9.71551E−03  | 7.82738E−02  | −1.21525E−01 | 8.10461E−02  | 3.12620E−01  | 1.06866E−02 |
| A8  | −2.43483E−02 | −5.46723E−02 | −8.19386E−02 | −1.01145E−01 | −3.04821E−01 | −1.15984E−02 |
| A10 | 7.63834E−04  | 1.26404E−01  | 1.54306E−01  | 4.57183E−02  | 2.00014E−01  | 7.74896E−03 |
| A12 | 5.97866E−03  | 0.00000E+00  | −8.41133E−02 | −8.55866E−03 | −8.51187E−02 | −2.07850E−03 |
| A14 | −8.87636E−03 | 0.00000E+00  | 2.02896E−02  | 4.42919E−04  | 2.07222E−02  | 1.16093E−04 |
| A16 | 0.00000E+00  | 0.00000E+00  | 0.00000E+00  | 0.00000E+00  | −2.15500E−03 | 3.42064E−05 |

[Effects]

Because the imaging lens 20 of the present example satisfies the conditional expressions (1)-(3), the total length of the lens system can be kept short, and curvature of field and chromatic aberration can be restrained. Chromatic aberration can also be corrected well in the present example because the third second lens 222 comprising a material of low dispersion is arranged adjacent to the fourth lens 231 comprising a material of high dispersion.

The third lens 222 of the second group lens 22, the fourth lens 231 (the third group lens 23), and the fifth lens 241 (the fourth group lens 24) in the present example are provided with aspherical shapes for the lens surfaces on the object side 222a, 231a, and 241a and the lens surfaces on the image side 222b, 231b, and 241b. As a result, numerical aperture: Fno.=2, and the imaging lens 20 takes on a bright configuration. The total length of the lens system L can also be restrained to a short 12.300 mm in the present example.

Figure 4A:
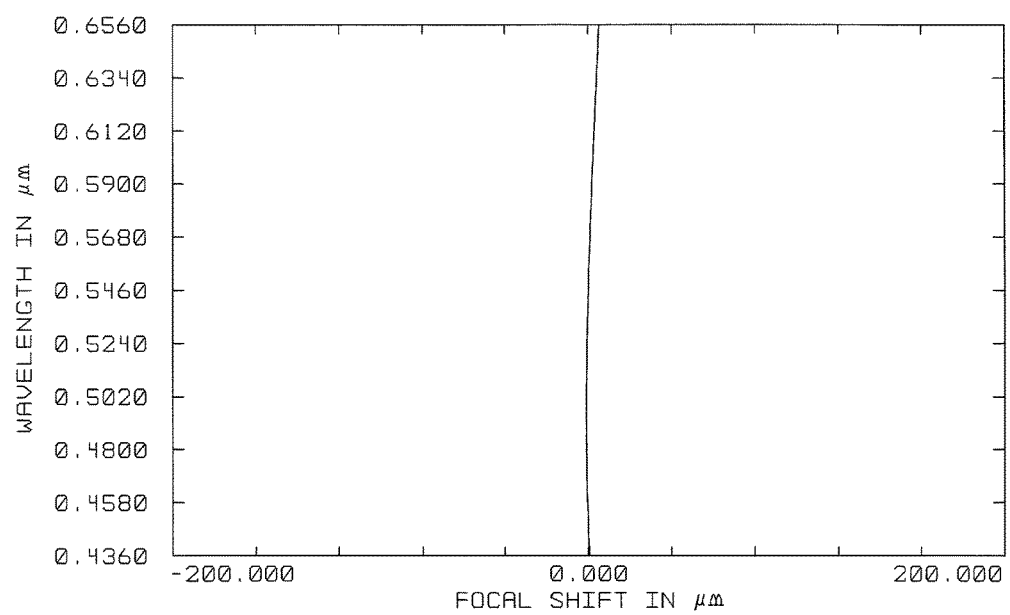
FIG. 4A is an axial chromatic aberration diagram of the imaging lens of FIG. 3.
Figure 4B:
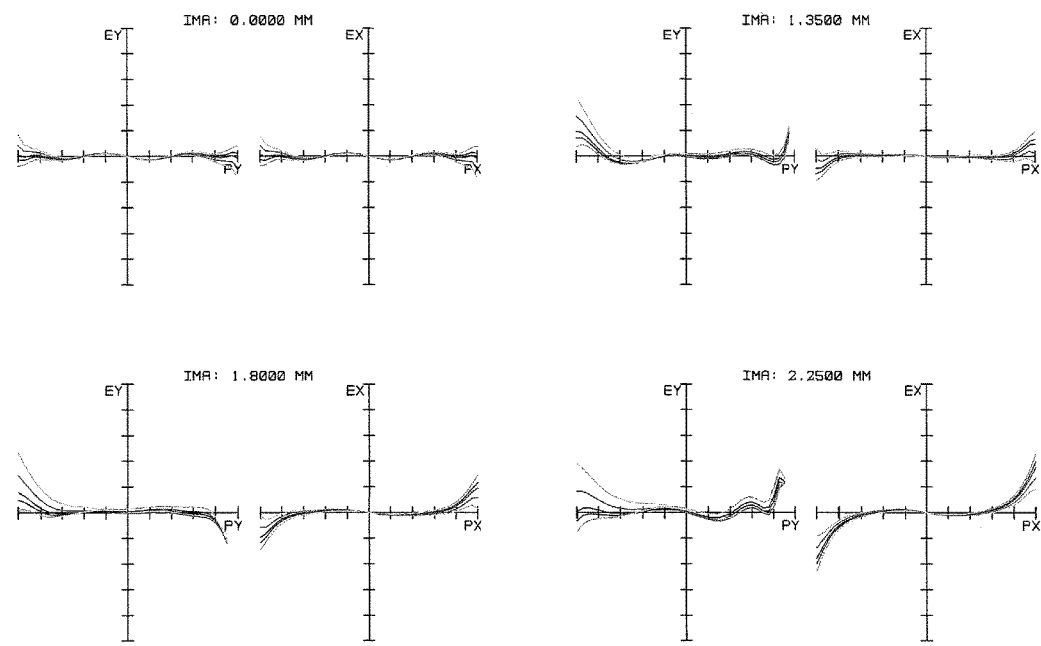
FIG. 4B is a lateral aberration diagram of the imaging lens of FIG. 3.
Figure 4C:
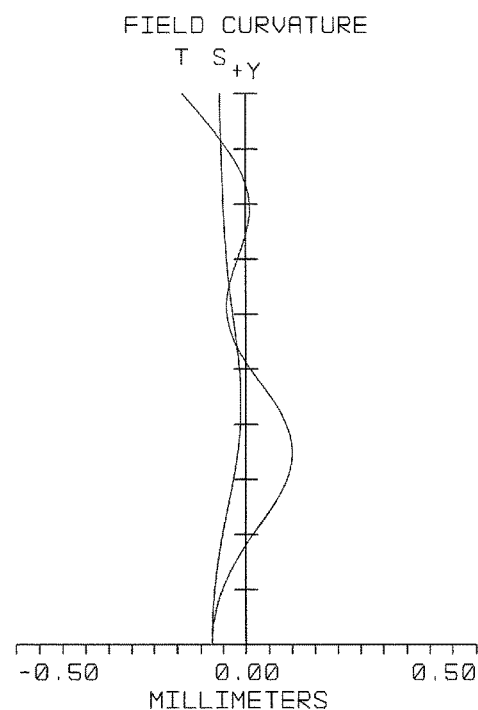
FIG. 4C is a curvature of field diagram of the imaging lens of FIG. 3.
Figure 4D:
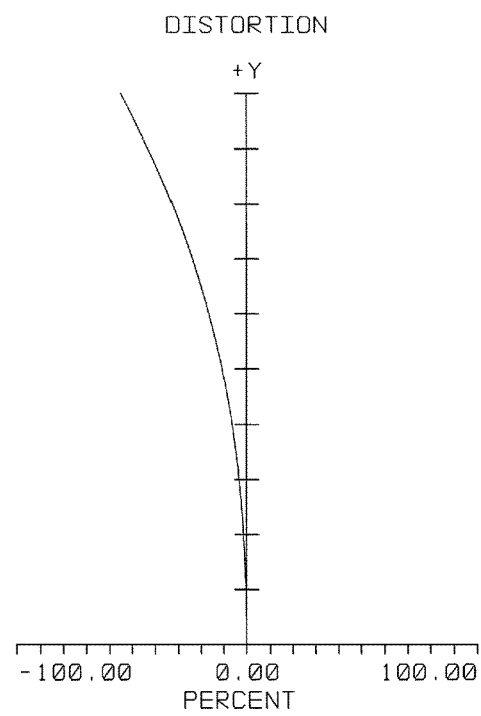
FIG. 4D is a distortion aberration diagram of the imaging lens of FIG. 3.

FIGS. 4A-4D are an axial chromatic aberration diagram, a lateral aberration diagram, a curvature of field diagram, and a distortion aberration diagram of the imaging lens 20. As shown in FIG. 4A, axial chromatic is corrected well according to the imaging lens 20 of the present example. As shown in FIG. 4B, color bleeding is restrained. As shown in FIGS. 4C and 4D, curvature of field is corrected well. Therefore, the imaging lens 20 has high resolution.

Example 3

Figure 5:
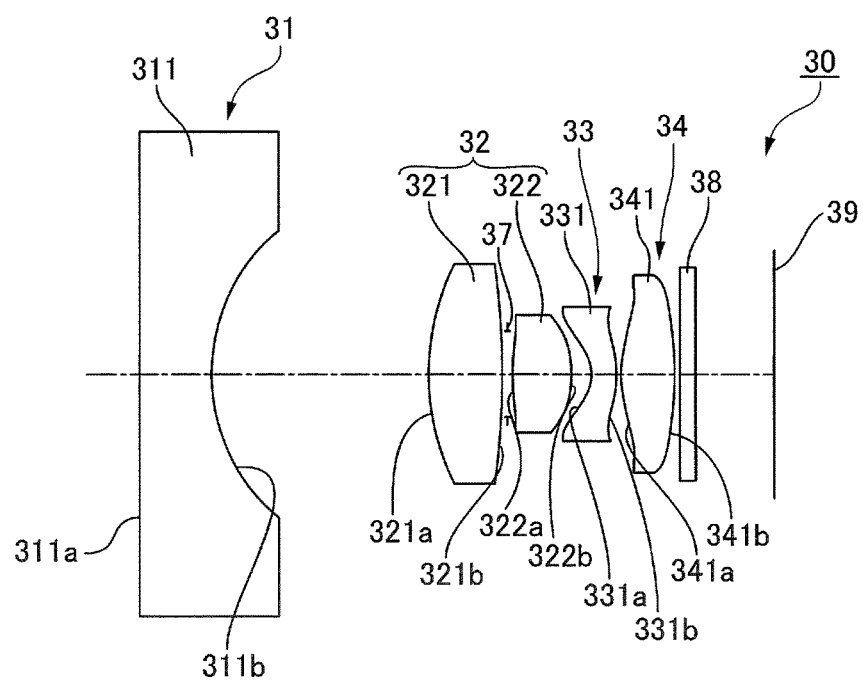
FIG. 5 is a block diagram of an imaging lens of Example 3 to which the present invention is applied.

FIG. 5 is a block diagram of the imaging lens 30 of Example 3. As shown in FIG. 5, the imaging lens 30 comprises a first group lens 31 having negative power, a second group lens 32 having positive power, a third group lens 33 having negative power, and a fourth group lens 34 having positive power arranged in the stated order from the object side toward the image side. The imaging lens 30 of the present example has a configuration comprising five lenses, where the first group lens 31 comprises one first lens 311, the second group lens 32 comprises two lenses of a second lens 321 and a third lens 322, the third group lens 33 comprises one fourth lens 331, and the fourth group lens 34 comprises one fifth lens 341. A diaphragm 37 is arranged between the second lens 321 and the third lens 322 in the second group lens 32. A cover glass 38 is arranged on the image side of the fifth lens 341. The image plane 39 is positioned with a gap between the image plane 39 and the cover glass 38.

The first lens 311 is provided with a planar shape for the lens surface on the object side 311a, and a concave shape for the lens surface on the image side 311b. The second lens 321 is provided with a convex shape for both the lens surface on the object side 321a and the lens surface on the image side 321b. The third lens 322 is provided with a convex shape for both the lens surface on the object side 322a and the lens surface on the image side 322b. The fourth lens 331 is provided with a concave shape for the lens surface on the object side 331a, and a convex shape for the lens surface on the image side 331b. The fifth lens 341 is provided with a convex shape for both the lens surface on the object side 341a and the lens surface on the image side 341b.

Where Fno. is the numerical aperture of the imaging lens 30, ω is the half angle view, and L is the total length of the lens system, these values are as follows.

Fno.=2
ω=56.5°
L=12.303 mm

Where f is the focal length of the entire lens system, ff1 is the focal length of the first group lens 31 (the first lens 311), ff2 is the focal length of the second group lens 32 (the second lens 321 and the third lens 322), ff3 is the focal length of the third group lens 33 (the fourth lens 331), and ff4 is the focal length of the fourth group lens 34 (the fifth lens 341), these values are as follows.

f=1.986
ff1=−6.278
ff2=2.321
ff3=−1.602
ff4=2.206

Where ff21 is the focal length of the second lens 321 comprising the second group lens 32, and ff22 is the focal length of the third lens 322, these values are as follows.

ff21=5.442
ff22=2.766

The imaging lens 30 of the present examples satisfies the following conditional expressions (1)-(3).

$$1.0 \leq f2/f=1.17 \leq 2 \quad (1)$$

$$-2.0 \leq f2/f3=-1.38 \leq -1.0 \quad (2)$$

$$0.5 \leq f4/f=1.11 \leq 2.0 \quad (3)$$

The following conditional expressions (4) and (5) are satisfied in the present example, where vd2 is the Abbe number of the third lens 322, which has the larger of Abbe number of the second lens 321 and the third lens 322 comprising the second group lens 32, and vd3 is the Abbe number of the third group lens 33 (the fourth lens 331).

$$vd2=56 \geq 40 \quad (4)$$

$$vd3=23.4 \leq 35 \quad (5)$$

Next, Table 3A shows lens data of the lens surfaces of the imaging lens 30. Table 3A specifies the lens surfaces in order counting from the object side. Lens surfaces marked with asterisks are aspherical surfaces. In the present example, the lens surfaces on the object side 322a, 331a, and 341a and the lens surfaces on the image side 322b, 331b, and 341b of the third lens 322, fourth lens 331 (the third group lens 33), and the fifth lens 341 (the fourth group lens 34) are provided with aspherical shapes. S indicates the diaphragm 37. The $12^{th}$ and $13^{th}$ surfaces are the glass surfaces of the cover glass 38. The unit for the radius of curvature and the gap is millimeters.

TABLE 3A

| Surface No. | Radius of curvature | Gap | Nd (refractive index) | Vd (Abbe number) |
|---|---|---|---|---|
| $1^{st}$ surface | Infinity | 1.410 | 1.5168 | 64.2 |
| $2^{nd}$ surface | 3.256 | 4.207 | | |
| $3^{rd}$ surface | 4.348 | 1.429 | 1.6200 | 36.4 |
| $4^{th}$ surface | −13.567 | 0.100 | | |
| $5^{th}$ surface S | Infinity | 0.101 | | |
| $6^{th}$ surface * | 4.090 | 1.119 | 1.5346 | 56.0 |
| $7^{th}$ surface * | −2.109 | 0.386 | | |
| $8^{th}$ surface * | −0.633 | 0.484 | 1.6323 | 23.4 |
| $9^{th}$ surface * | −2.152 | 0.087 | | |
| $10^{th}$ surface * | 1.414 | 1.056 | 1.5346 | 56.0 |
| $11^{th}$ surface * | −5.405 | 0.100 | | |
| $12^{th}$ surface | Infinity | 0.300 | 1.5168 | 64.2 |
| $13^{th}$ surface | Infinity | 1.406 | | |

Next, Table 3B indicates aspherical coefficients for prescribing the aspherical shape of a lens surface made to have an aspherical shape. Table 3B likewise specifies the lens surfaces in order counting from the object side.

TABLE 3B

| | Sixth Surface | Seventh Surface | Eighth Surface | Ninth Surface | Tenth Surface | Eleventh Surface |
|---|---|---|---|---|---|---|
| K | −76.1177 | −31.1790 | −1.2321 | 1.8229 | −24.0941 | 0.0000 |
| A4 | 8.93944E−02 | −4.55920E−01 | 7.10750E−02 | −3.45248E−01 | 1.64176E−02 | 3.16849E−03 |
| A6 | −1.76226E−01 | 4.64097E−01 | 2.58089E−01 | 1.41096E+00 | 3.65178E−02 | 1.37311E−02 |
| A8 | 1.06904E−01 | −3.27719E−01 | 9.32169E−02 | −2.00748E+00 | −5.64218E−02 | −4.94053E−03 |
| A10 | −6.20285E−02 | 9.82264E−02 | −7.27773E−01 | 1.71460E+00 | 2.60727E−02 | −3.06896E−03 |
| A12 | 0.00000E+00 | 0.00000E+00 | 6.90419E−01 | −8.10550E−01 | −2.38309E−03 | 1.71232E−03 |
| A14 | 0.00000E+00 | 0.00000E+00 | −2.01703E−01 | 1.64603E−01 | −1.58029E−03 | −1.83080E−04 |
| A16 | 0.00000E+00 | 0.00000E+00 | 0.00000E+00 | 0.00000E+00 | 3.25406E−04 | −2.12665E−05 |

[Effects]

Because the imaging lens 30 of the present example satisfies the conditional expressions (1)-(3), the total length of the lens system can be kept short, and curvature of field and chromatic aberration can be restrained. Chromatic aberration can also be corrected well in the present example because the third lens 322 comprising a material of low dispersion is arranged adjacent to the fourth lens 331 comprising a material of high dispersion.

The third lens 322 of the second group lens 32, the fourth lens 331 (the third group lens 33), and the fifth lens 341 (the fourth group lens 34) in the present example are provided with aspherical shapes on the lens surfaces on the object side 322a, 331a, and 341a and the lens surfaces on the image side 322b, 331b, and 341b. As a result, numerical aperture: Fno.=2, and the imaging lens 30 takes on a bright configuration. The total length of the lens system L can also be restrained to a short 12.303 mm in the present example.

Figure 6A:
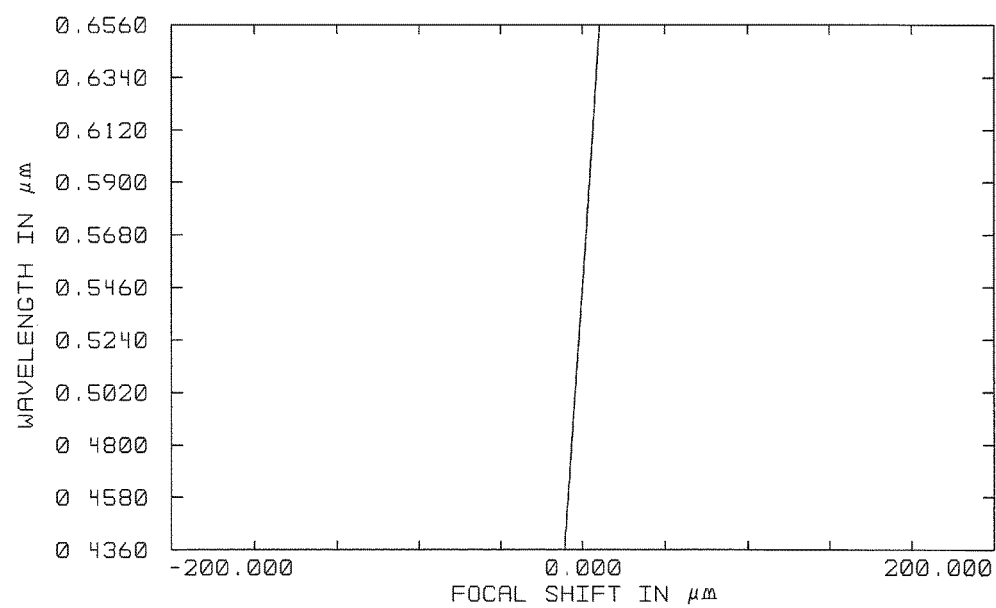
FIG. 6A is an axial chromatic aberration diagram of the imaging lens of FIG. 5.
Figure 6B:
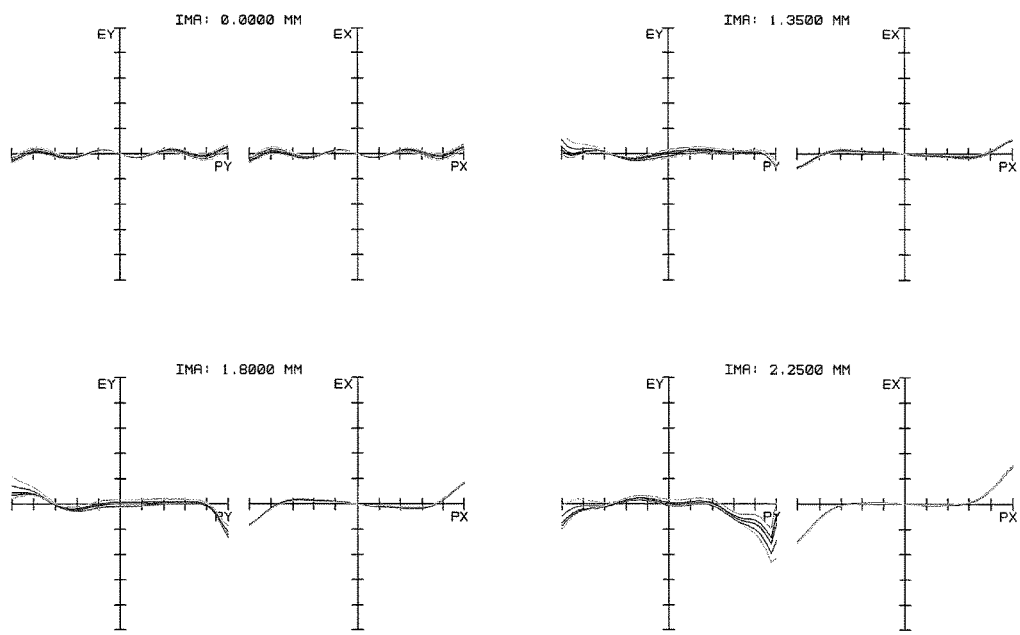
FIG. 6B is a lateral aberration diagram of the imaging lens of FIG. 5.
Figure 6C:
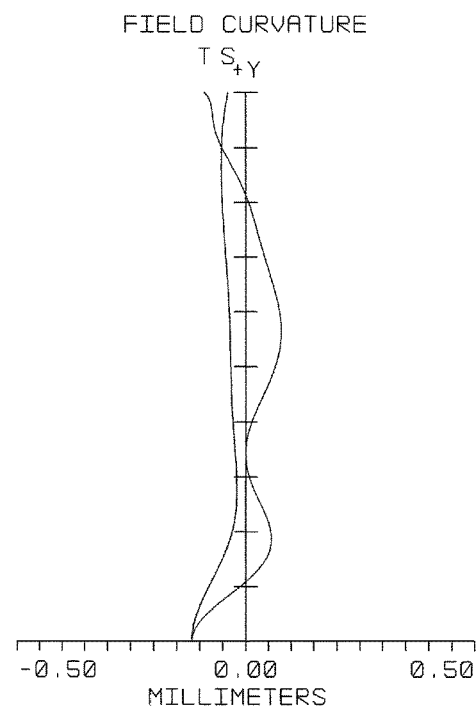
FIG. 6C is a curvature of field diagram of the imaging lens of FIG. 5.
Figure 6D:
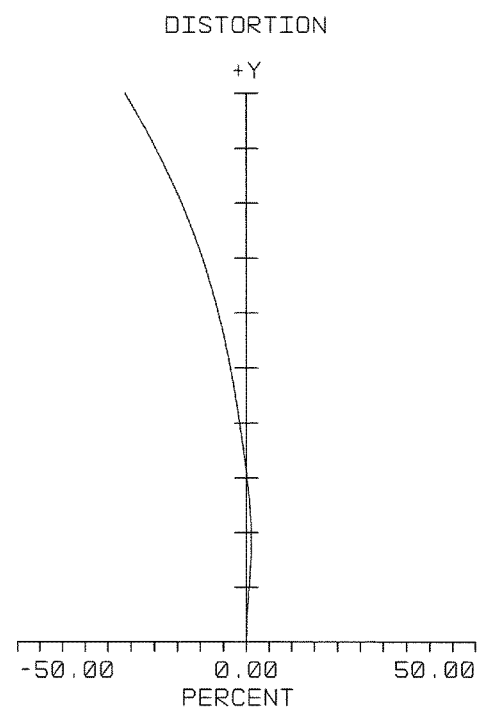
FIG. 6D is a distortion aberration diagram of the imaging lens of FIG. 5.

FIG. 6A-6D are an axial chromatic aberration diagram, a lateral aberration diagram, a curvature of field diagram, and a distortion aberration diagram of the imaging lens 30. As shown in FIG. 6A, axial chromatic is corrected well according to the imaging lens 30 of the present example. As shown in FIG. 6B, color bleeding is restrained. As shown in FIGS. 6C and 6D, curvature of field is corrected well. Therefore, the imaging lens 30 has high resolution.

Example 4

Figure 7:
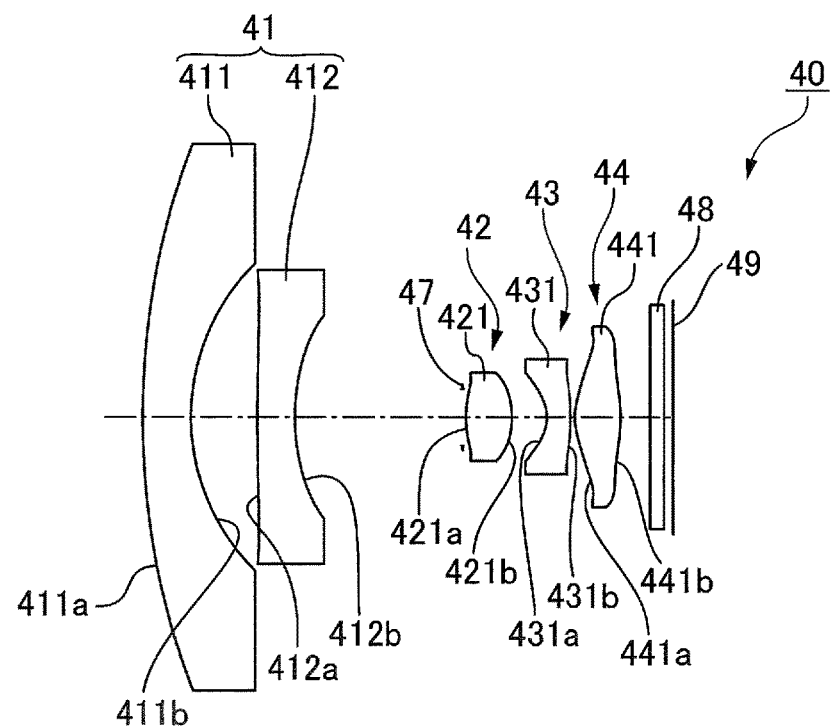
FIG. 7 is a block diagram of an imaging lens of Example 4 to which the present invention is applied.

FIG. 7 is a block diagram of the imaging lens 40 of Example 4. As shown in FIG. 7, the imaging lens 40 comprises a first group lens 41 having negative power, a second group lens 42 having positive power, a third group lens 43 having negative power, and a fourth group lens 44 having positive power arranged in the stated order from the object side toward the image side. The imaging lens 40 of the present example has a configuration comprising five lenses, where the first group lens 41 comprises two lenses of a first lens 411 and a second lens 412, the second group lens 42 comprises one third lens 421, the third group lens 43 comprises one fourth lens 431, and the fourth group lens 44 comprises one fifth lens 441. A diaphragm 47 is arranged between the first group lens 41 and the second group lens 42; that is, between the second lens 412 and the third lens 421. A cover glass 48 is arranged on the image side of the fifth lens 441. The image plane 49 is positioned with a gap between the image plane 49 and the cover glass 48.

The first lens 411 is provided with a convex shape for the lens surface on the object side 411a, and a concave shape for the lens surface on the image side 411b. The second lens 412 is provided with a convex shape for the lens surface on the object side 412a, and a concave shape for the lens surface on the image side 412b. The third lens 421 is provided with a convex shape for both the lens surface on the object side 421a and the lens surface on the image side 421b. The fourth lens 431 is provided with a concave shape for the lens surface on the object side 431a, and a convex shape for the lens surface on the image side 431b. The fifth lens 441 is provided with a convex shape for both the lens surface on the object side 441a and the lens surface on the image side 441b.

Where Fno. is the numerical aperture of the imaging lens 40, u is the half angle view, and L is the total length of the lens system, these values are as follows.

Fno.=2.4
ω=95°
L=11.16 mm

Where f is the focal length of the entire lens system, ff1 is the focal length of the first group lens 41 (the first lens 411 and the second lens 412), ff2 is the focal length of the second group lens 42 (the third lens 421), ff3 is the focal length of the third group lens 43 (the fourth lens 431), and ff4 is the focal length of the fourth group lens 44 (the fifth lens 441), these values are as follows.

f=1.376
ff1=−4.394
ff2=1.754
ff3=−1.114
ff4=1.446

Where ff11 is the focal length of the first lens 41 comprising the first group lens 41, and ff12 is the focal length of the second lens 412, these values are as follows.

ff11=−11.304
ff12=−8.279

The imaging lens 40 satisfies the following conditional expressions (1)-(3).

$1.0 \leq f\!f2/f = 1.27 \leq 2.0$ (1)

$-2.0 \leq f\!f2/f\!f3 = -1.57 \leq -1.0$ (2)

$0.5 \leq f\!f4/f = 1.05 \leq 2.0$ (3)

The following conditional expressions (4) and (5) are satisfied in the present example, where vd2 is the Abbe number of the second group lens 42 (the third lens 421), and vd3 is the Abbe number of the third group lens 43 (the fourth lens 431).

$vd2 = 56 \geq 40$ (4)

$vd3 = 23.4 \leq 35$ (5)

Next, Table 4A shows lens data of the lens surfaces of the imaging lens 40. Table 4A specifies the lens surfaces in order counting from the object side. Lens surfaces marked with asterisks are aspherical surfaces. In the present example, the lens surfaces on the object side 412a, 421a, 431a, and 441a and the lens surfaces on the image side 412b, 421b, 431b, and 441b of the second lens 412, the third lens 421 (the third group lens 43), the fourth lens 431 (the third group lens 43), and the fifth lens 441 (the fourth group lens 44) have been provided with aspherical shapes. S indicates the diaphragm 47. The $12^{th}$ and $13^{th}$ surfaces are the glass surfaces of the cover glass 48. The unit for the radius of curvature and the gap is millimeters.

TABLE 4A

| Surface No. | Radius of curvature | Gap | Nd (refractive index) | Vd (Abbe number) |
|---|---|---|---|---|
| $1^{st}$ surface | 14.550 | 1.000 | 1.5168 | 64.2 |
| $2^{nd}$ surface | 4.081 | 1.400 | | |
| $3^{rd}$ surface * | 40.204 | 0.800 | 1.5346 | 56.0 |
| $4^{th}$ surface * | 3.975 | 3.514 | | |
| $5^{th}$ surface S | Infinity | 0.076 | | |
| $6^{th}$ surface * | 1.848 | 0.957 | 1.5346 | 56.0 |
| $7^{th}$ surface * | −1.573 | 0.738 | | |
| $8^{th}$ surface * | −0.646 | 0.511 | 1.6319 | 23.4 |
| $9^{th}$ surface * | −9.274 | 0.096 | | |
| $10^{th}$ surface * | 0.977 | 0.952 | 1.5346 | 56.0 |
| $11^{th}$ surface * | −2.496 | 0.631 | | |
| $12^{th}$ surface | Infinity | 0.300 | 1.5168 | 64.2 |
| $13^{th}$ surface | Infinity | 0.185 | | |

Next, Table 4B shows the aspherical coefficients of the lens surfaces of the second lens 412, and Table 4C shows the aspherical coefficients of the lens surfaces of the third lens 421, the fourth lens 431, and the fifth lens 441. Table 4B and 4C likewise specify the lens surfaces in order counting from the object side.

TABLE 4B

| | Third Surface | Fourth Surface |
|---|---|---|
| K | 0.94197 | 0.0000 |
| A4 | −8.31314E−04 | −1.99687E−03 |
| A6 | 0.00000E+00 | 0.00000E+00 |
| A8 | −8.37785E−06 | 2.20270E−04 |
| A10 | 0.00000E+00 | 0.00000E+00 |
| A12 | 0.00000E+00 | 0.00000E+00 |
| A14 | 0.00000E+00 | 0.00000E+00 |
| A16 | 0.00000E+00 | 0.00000E+00 |

TABLE 4C

| | Sixth Surface | Seventh Surface | Eighth Surface | Ninth Surface | Tenth Surface | Eleventh Surface |
|---|---|---|---|---|---|---|
| K | −18.2384 | 0.9139 | −2.7300 | 52.1381 | −10.6356 | −9.5943 |
| A4 | 2.46187E−01 | −3.32402E−02 | −2.41999E−01 | −5.04485E−01 | 1.85174E−03 | 9.47311E−02 |
| A6 | −6.42345E−01 | 5.25652E−02 | 2.78515E−01 | 1.43769E+00 | 4.44951E−02 | −6.16763E−02 |
| A8 | 7.20341E−01 | −9.67462E−02 | 9.90897E−02 | −2.06043E+00 | −5.78888E−02 | 3.49914E−02 |
| A10 | −5.70160E−01 | −9.46137E−04 | −8.31946E−01 | 1.78188E+00 | 3.23753E−02 | −1.26670E−02 |
| A12 | 0.00000E+00 | 0.00000E+00 | 8.60049E−01 | −8.45602E−01 | 7.75381E−03 | 1.74547E−03 |
| A14 | 0.00000E+00 | 0.00000E+00 | −2.11841E−01 | 1.70771E−01 | −1.28007E−04 | 2.67588E−05 |
| A16 | 0.00000E+00 | 0.00000E+00 | 0.00000E+00 | 0.00000E+00 | 2.19284E−04 | −2.30456E−05 |

[Effects]

Because the imaging lens 40 of the present example satisfies the conditional expression (1)-(3), the total length of the lens system can be kept short, and curvature of field and chromatic aberration can be restrained. Chromatic aberration can also be corrected well in the present example because the third lens 421 comprising a material of low dispersion is arranged adjacent to the fourth lens 431 comprising a material of high dispersion.

The second lens 412, the third lens 421 (the second group lens 42), the fourth lens 431 (the third group lens 43), and the fifth lens 441 (the fourth group lens 44) in the present example are provided aspherical shapes for the lens surfaces on the object side 412a, 421a, 431a, and 441a and the lens surfaces on the image side 412b, 421b, 431b, and 441b. As a result, numerical aperture: Fno.=2.4, and the imaging lens 40 takes on a bright configuration. The total length of the lens system L can also be restrained to a short 11.16 mm in the present example.

Figure 8A:
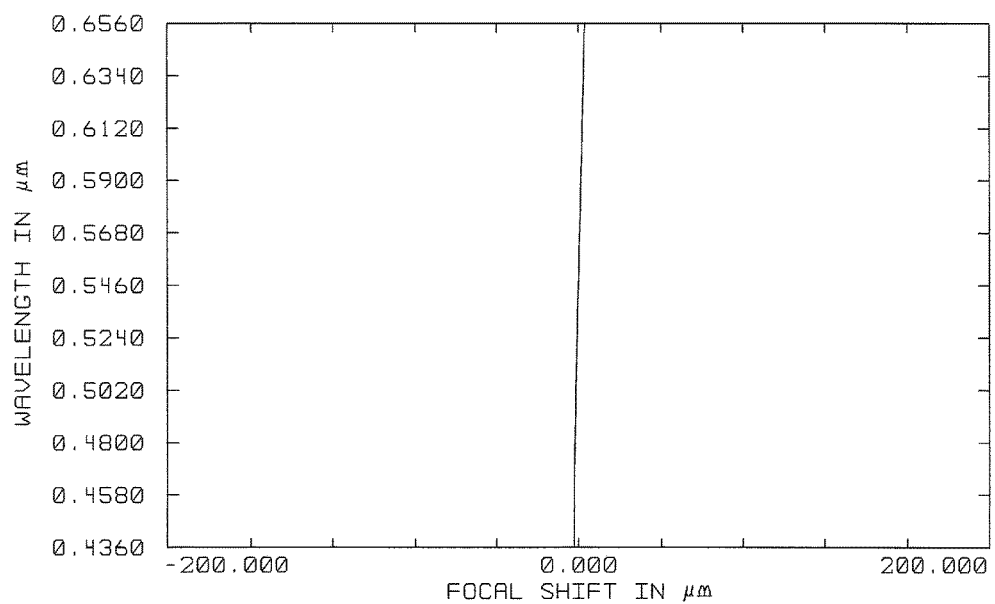
FIG. 8A is an axial chromatic aberration diagram of the imaging lens of FIG. 7.
Figure 8B:
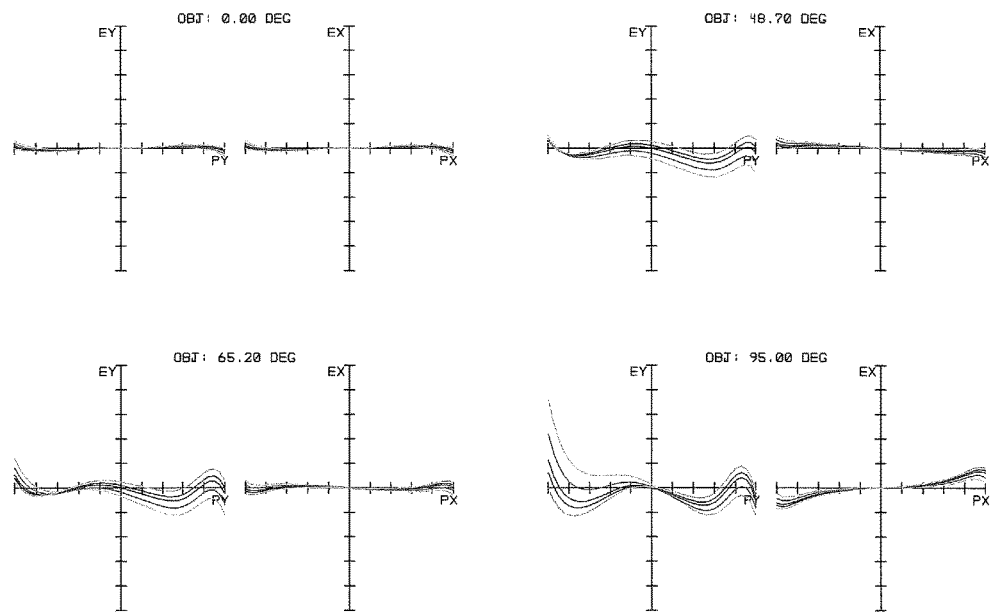
FIG. 8B is a lateral aberration diagram of the imaging lens of FIG. 7.
Figure 8C:
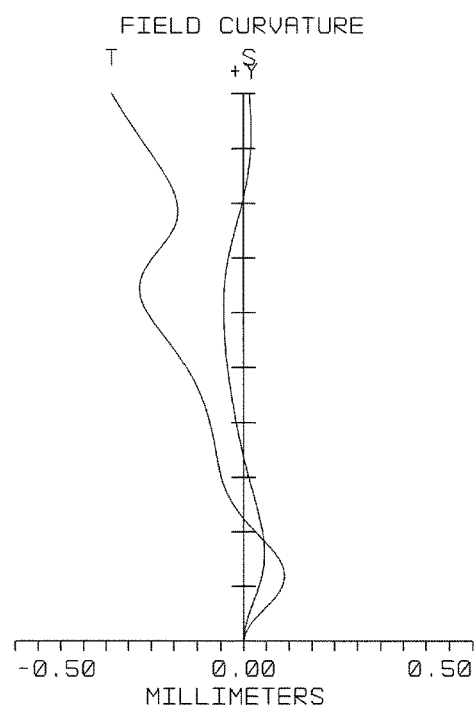
FIG. 8C is a curvature of field diagram of the imaging lens of FIG. 7.
Figure 8D:
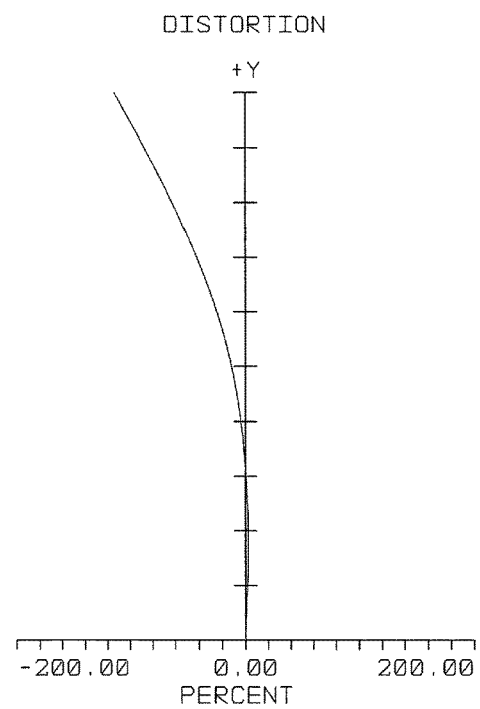
FIG. 8D is a distortion aberration diagram of the imaging lens of FIG. 7.

FIGS. 8A-8D are an axial chromatic aberration diagram, a lateral aberration diagram, a curvature of field diagram, and a distortion aberration diagram of the imaging lens 40. As shown in FIG. 8A, axial chromatic is corrected well according to the imaging lens 40 of the present example. As shown in FIG. 8B, color bleeding is restrained. As shown in FIGS. 8C and 8D, curvature of field is corrected well. Therefore, the imaging lens 40 has high resolution.

Example 5

Figure 9:
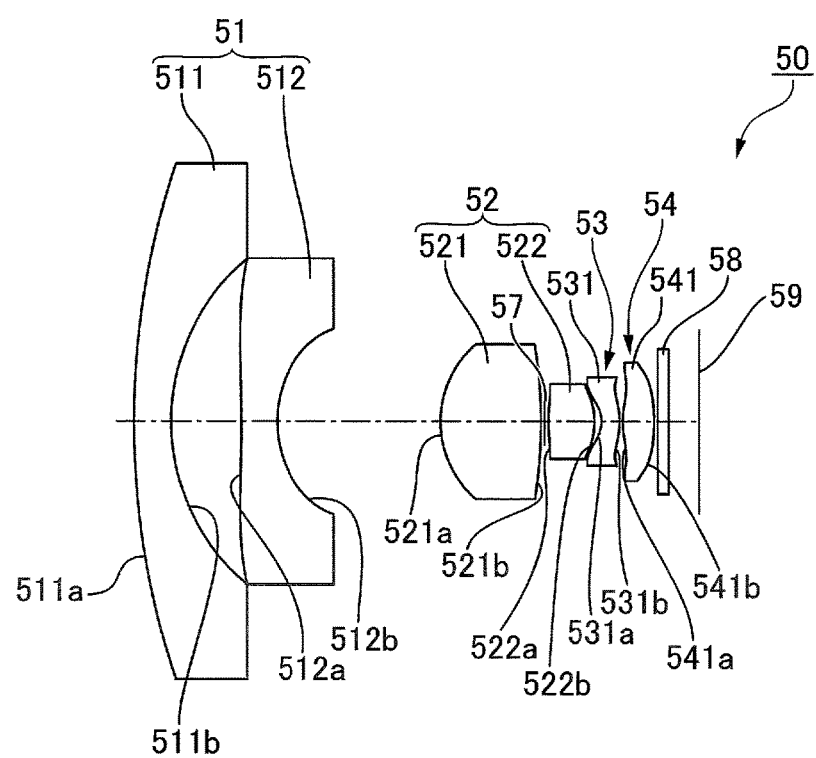
FIG. 9 is a block diagram of an imaging lens of Example 5 to which the present invention is applied.

FIG. 9 is a block diagram of the imaging lens 50 of Example 5. As shown in FIG. 9, the imaging lens 50 comprises a first group lens 51 having negative power, a second group lens 52 having positive power, a third group lens 53 having negative power, and a fourth group lens 54 having positive power arranged in the stated order from the object side toward the image side. The imaging lens 50 of the present example has a configuration comprising six lenses, where the first group lens 51 comprises two lenses of a first lens 511 and a second lens 512, the second group lens 52 comprises two lenses of a third lens 521 and a fourth lens 522, the third group lens 53 comprises one fifth lens 531, and the fourth group lens 54 comprises one sixth lens 541. A diaphragm 57 is arranged between the third lens 521 and the fourth lens 522 comprising the second group lens 52. A cover glass 58 is arranged on the image side of the sixth lens 541. The image plane 59 is positioned with a gap between the image plane 59 and the cover glass 58.

The first lens 511 is provided with a convex shape for the lens surface on the object side 511a, and a concave shape for the lens surface on the image side 511b. The second lens 512 is provided with a concave shape for both the lens surface on the object side 512a and the lens surface on the image side 512b. The third lens 521 is provided with a convex shape for both the lens surface on the object side 521a and the lens surface on the image side 521b. The fourth lens 522 is provided with a convex shape for both the lens surface on the object side 522a and the lens surface on the image side 522b. The fifth lens 531 is provided with a concave shape for the lens surface on the object side 531a, and a convex shape for the lens surface on the image side 531b. The sixth lens 541 is provided with a convex shape for both the lens surface on the object side 541a and the lens surface on the image side 541b.

Where Fno. is the numerical aperture of the imaging lens 50, ω is the half angle view, and L is the total length of the lens system, these values are as follows.

Fno.=2.2
ω=72.8°
L=15.57 mm

Where f is the focal length of the entire lens system, ff1 is the focal length of the first group lens 51 (the first lens 511 and the second lens 512), ff2 is the focal length of the second group lens 52 (the third lens 521 and the fourth lens 522), ff3 is the focal length of the third group lens 53 (the fifth lens 531), and ff4 is the focal length of the fourth group lens 54 (the sixth lens 541), these values are as follows.

f=1.356
ff1=−3.279
ff2=2.459
ff3=−1.602
ff4=2.183

Where ff11 is the focal length of the first lens 511 comprising the first group lens 51, ff12 is the focal length of the second lens 512, ff21 is the focal length of the third lens 521 comprising the second group lens 52, and ff22 is the focal length of the fourth lens 522, these values are as follows.

ff11=−14.13
ff12=−4.958
ff21=3.649
ff22=2.793

The imaging lens 50 of the present example satisfies the following conditional expressions (1)-(3).

$$1.0 \leq ff2/f=1.81 \leq 2.0 \quad (1)$$

$$-2.0 \leq ff2/ff3=-1.53 \leq -1.0 \quad (2)$$

$$0.5 \leq ff4/f=1.61 \leq 2.0 \quad (3)$$

The following conditional expressions (4) and (5) are satisfied in the present example, where vd2 is the Abbe number of the fourth lens 522, which has the highest Abbe number in the second group lens 52 (the third lens 521 and the fourth lens 522), and vd3 is the Abbe number of the third group lens 53 (the fifth lens 531).

$$vd2=56 \leq 40 \quad (4)$$

$$vd3=23.4 \leq 35 \quad (5)$$

Next, Table 5A shows lens data of the lens surfaces of the imaging lens 50. Table 5A specifies the lens surfaces in order counting from the object side. Lens surfaces marked with asterisks are aspherical surfaces. In the present example, the lens surfaces on the object side 512a, 522a, 531a, and 541a and the lens surfaces on the image side 512b, 522b, 531b, and 541b of the second lens 512, the fourth lens 522 of the third group lens 53, the fifth lens 531 (the third group lens 53), and the sixth lens 541 (the fourth group lens 54) have been provided with aspherical shapes. S indicates the diaphragm 57. The 14$^{th}$ and 15$^{th}$ surfaces are the glass surfaces of the cover glass 58. The unit for the radius of curvature and the gap is millimeters.

TABLE 5A

| Surface No. | Radius of curvature | Gap | Nd (refractive index) | Vd (Abbe number) |
| --- | --- | --- | --- | --- |
| 1$^{st}$ surface | 20.108 | 1.000 | 1.5168 | 64.2 |
| 2$^{nd}$ surface | 5.280 | 1.916 | | |
| 3$^{rd}$ surface * | −40.323 | 1.000 | 1.5346 | 56.0 |
| 4$^{th}$ surface * | 2.875 | 4.468 | | |
| 5$^{th}$ surface | 2.566 | 2.755 | 1.6200 | 36.4 |
| 6$^{th}$ surface | −11.880 | 0.100 | | |
| 7$^{th}$ surface S | Infinity | 0.101 | | |
| 8$^{th}$ surface * | 4.090 | 1.277 | 1.5346 | 56.0 |
| 9$^{th}$ surface * | −2.109 | 0.198 | | |
| 10$^{th}$ surface * | −0.633 | 0.484 | 1.6322 | 23.4 |
| 11$^{th}$ surface * | −2.152 | 0.087 | | |
| 12$^{th}$ surface * | 1.414 | 0.860 | 1.5346 | 56.0 |
| 13$^{th}$ surface * | −5.405 | 0.100 | | |
| 14$^{th}$ surface | Infinity | 0.300 | | |
| 15$^{th}$ surface | Infinity | 0.825 | | |

Next, Table 5B shows the aspherical coefficients of the lens surfaces of the second lens 512, and Table 5C shows the aspherical coefficients of the lens surfaces of the fourth lens 522, the fifth lens 531, and the sixth lens 541. Table 5B, Table 5C likewise specifies the lens surfaces in order counting from the object side.

TABLE 5B

|  | Third Surface | Fourth Surface |
| --- | --- | --- |
| K | 0.0000 | 0.3272 |
| A4 | 1.22135E−03 | −1.50493E−04 |
| A6 | 0.00000E+00 | 0.00000E+00 |
| A8 | 0.00000E+00 | 0.00000E+00 |
| A10 | 0.00000E+00 | 0.00000E+00 |
| A12 | 0.00000E+00 | 0.00000E+00 |
| A14 | 0.00000E+00 | 0.00000E+00 |
| A16 | 0.00000E+00 | 0.00000E+00 |

TABLE 5C

|  | Eighth Surface | Ninth Surface | Tenth Surface | Eleventh Surface | Twelfth Surface | Thirteenth Surface |
| --- | --- | --- | --- | --- | --- | --- |
| K | −33.4283 | −24.4263 | −1.6077 | 1.8118 | −20.8115 | 0.0000 |
| A4 | 1.11999E−02 | −4.94861E−01 | 1.00494E−01 | −2.59338E−01 | −7.72364E−02 | −4.23518E−02 |
| A6 | −5.61040E−02 | 5.72189E−01 | 2.21374E−01 | 1.36070E+00 | 5.24617E−02 | −3.40797E−03 |
| A8 | −1.66559E−02 | −2.99204E−01 | 1.00065E−01 | −2.00144E+00 | −6.43273E−02 | 1.89923E−04 |
| A10 | 2.86662E−03 | 8.09019E−02 | −6.90465E−01 | 1.71902E+00 | 2.62442E−02 | −2.39820E−03 |
| A12 | 0.00000E+00 | 0.00000E+00 | 7.22800E−01 | −8.12671E−01 | −6.30518E−04 | 1.51250E−03 |
| A14 | 0.00000E+00 | 0.00000E+00 | −2.40809E−01 | 1.66304E−01 | −8.85557E−04 | −2.71444E−04 |
| A16 | 0.00000E+00 | 0.00000E+00 | 0.00000E+00 | 0.00000E+00 | 1.81016E−04 | 6.68224E−05 |

[Effects]

Because the imaging lens 50 of the present example satisfies the conditional expression (1)-(3), the total length of the lens system can be kept short, and curvature of field and chromatic aberration can be restrained. Chromatic aberration can also be corrected well in the present example because the fourth lens 522 comprising a material of low dispersion is arranged adjacent to the fifth lens 531 comprising a material of high dispersion.

The second lens 512, the fourth lens 522 of the second group lens 52, the fifth lens 531 (the third group lens 53), and the sixth lens 541 (the fourth group lens 54) in the present example are provided with aspherical shapes for the lens surfaces on the object side 512a, 522a, 531a, and 541a and the lens surfaces on the image side 512b, 522b, 531b, and 541b. As a result, numerical aperture: Fno.=2.2, and the imaging lens 50 takes on a bright configuration. The total length of the lens system L can also be restrained to a short 15.57 mm in the present example.

Figure 10A:
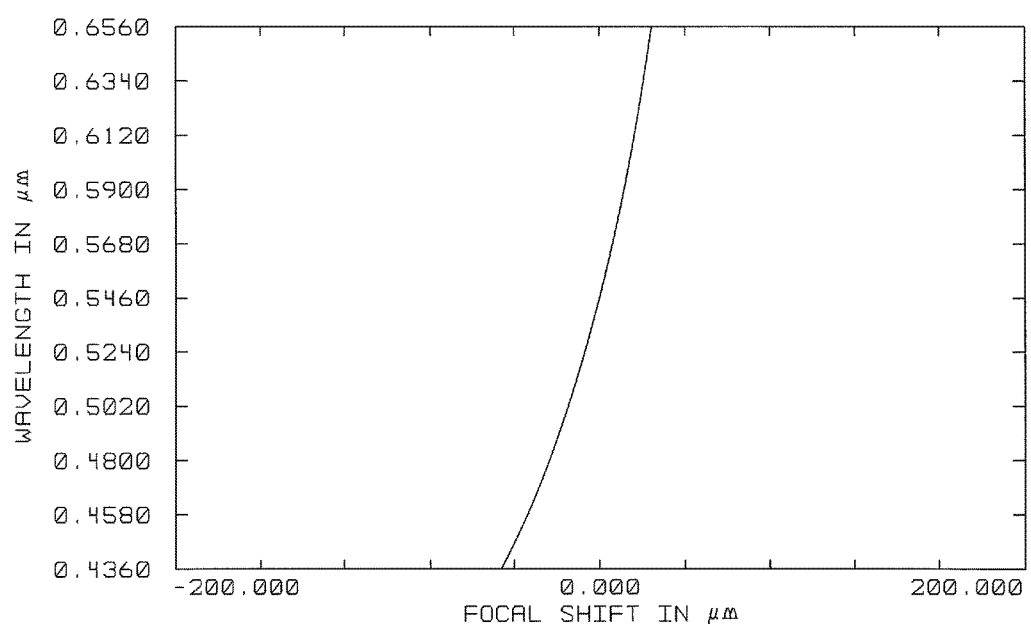
FIG. 10A is an axial chromatic aberration diagram of the imaging lens of FIG. 9.
Figure 10B:
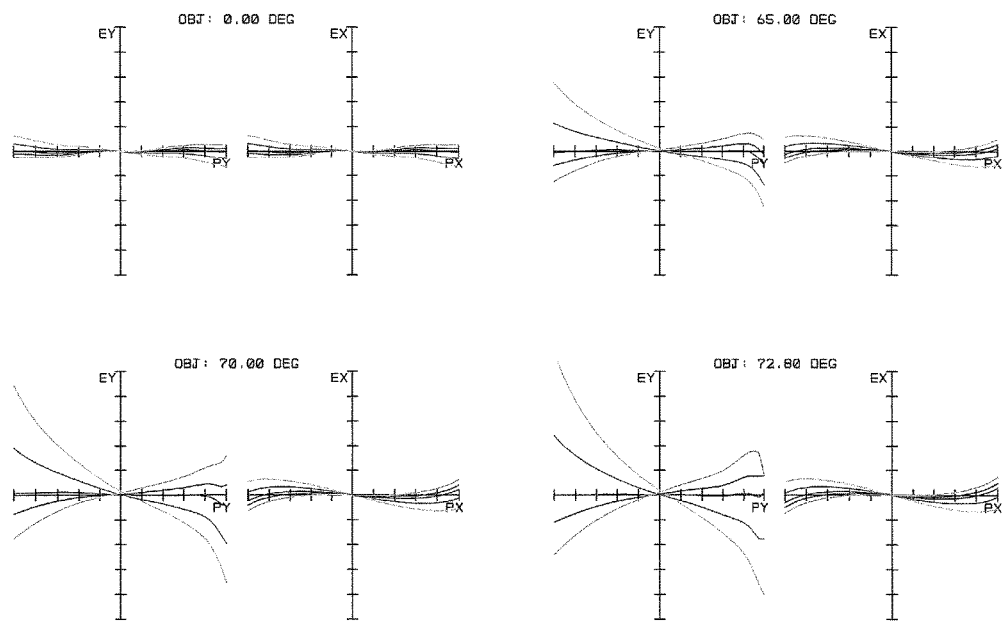
FIG. 10B is a lateral aberration diagram of the imaging lens of FIG. 9.
Figure 10C:
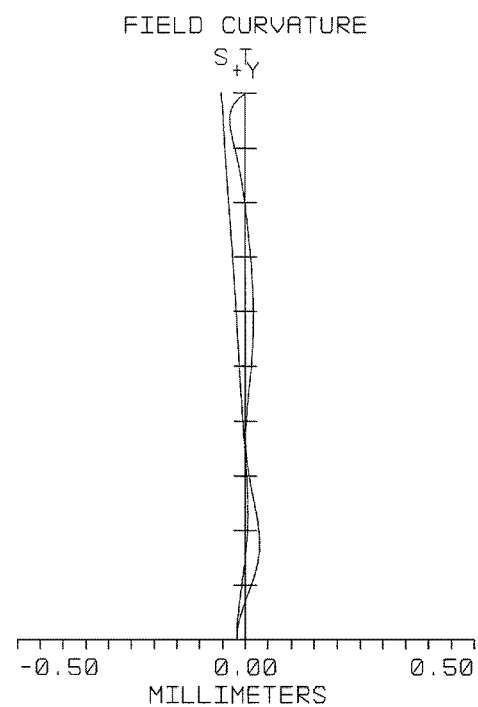
FIG. 10C is a curvature of field diagram of the imaging lens of FIG. 9.
Figure 10D:
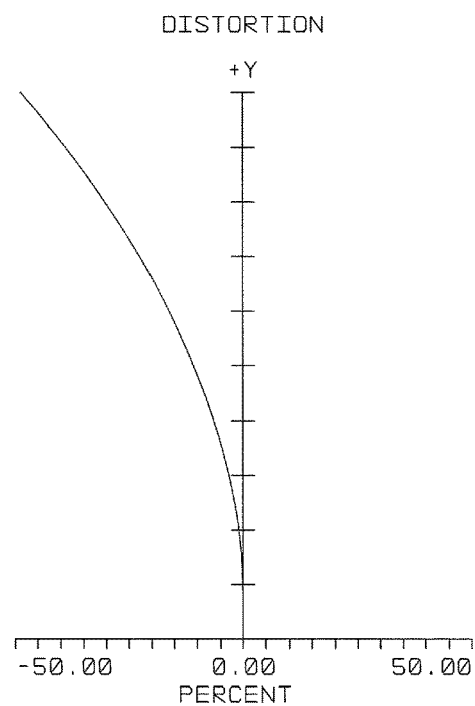
FIG. 10D is a distortion aberration diagram of the imaging lens of FIG. 9.

FIG. 10A-10D are an axial chromatic aberration diagram, a lateral aberration diagram, a curvature of field diagram, and a distortion aberration diagram of the imaging lens 50. As shown in FIG. 10A, axial chromatic is corrected well according to the imaging lens 50 of the present example. As shown in FIG. 10B, color bleeding is restrained. As shown in FIGS. 10C and 10D, curvature of field is corrected well. Therefore, the imaging lens 50 has high resolution.

[Imaging Device]

Figure 11:
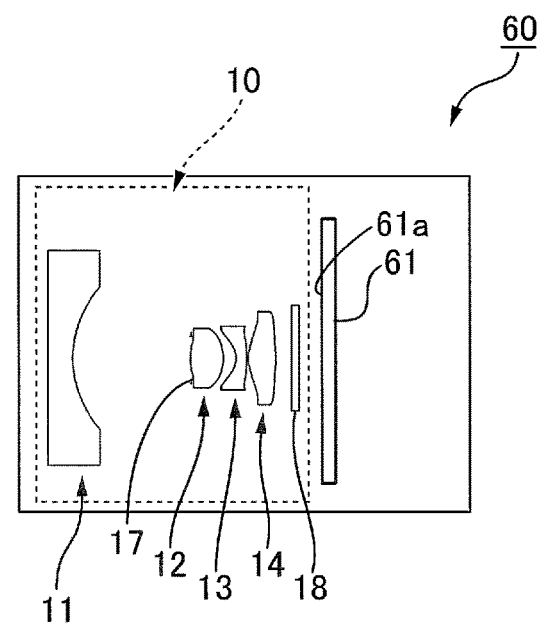
FIG. 11 is a diagram illustrating an imaging device equipped with an imaging lens.

FIG. 11 is a diagram illustrating an imaging device 60 equipped with the imaging lens 10. As shown in FIG. 11, the imaging device 60 is provided with an image pick-up device 61 having a sensor surface 61a arranged on the image plane 19 (the focal position) of the imaging lens 10. The image pick-up device 61 is a CCD sensor or a cMOS sensor.

According to the present example, because the imaging lens 10 has high resolution, the imaging device 60 can be made high-resolution by employing an image pick-up device 61 having a large pixel number as the image pick-up device 61. Because the total length of the lens system of the imaging lens 10 is a short length L, the imaging device 60 can also be made small-sized. The imaging lenses 20, 30, 40, and 50 can be mounted in the imaging device 60 in the same manner as the imaging lens 10, and can obtain the same effects when so mounted.

[Symbols]

10, 20, 30, 40, 50 Imaging lens example
11, 21, 31, 41, 51 First group lens
12, 22, 32, 42, 52 Second group lens
13, 23, 33, 43, 53 Third group lens
14, 24, 34, 44, 54 Fourth group lens
17, 27, 37, 47, 57 Diaphragm
18, 28, 38, 48, 58 Cover glass
19, 29, 39, 49, 59 Image plane
60 Imaging device
61 Image pick-up device
61a Sensor surface

The invention claimed is:

1. A wide-angle lens comprising:
   a first group lens having negative power, a second group lens having positive power, a third group lens having negative power, and a fourth group lens having positive power arranged in order from an object side toward an image side;
   the first group lens comprising one lens having negative power or two lenses both having negative power;
   the second group lens comprising one lens having positive power or two lenses both having positive power;
   the third group lens comprising one lens having negative power; and
   the fourth group lens comprising one lens having positive power, wherein
   the lens or group lenses constituting the first group lens is provided with a concave shape for a lens surface on the image side;
   the lens or group lenses of the second group lens arranged adjacent to the third group lens is provided with a convex shape for a lens surface on the image side;
   the lens of the third group lens is a meniscus lens having a concave shape for a lens surface on the object side;
   at least one of the lenses constituting the second group lens and the third group lens is made to have an aspherical shape for at least either one of lens surfaces on the object side and the image side;
   the lens of the fourth group lens is made to have an aspherical shape for both lens surfaces on the object side and the image side; and the following conditional expressions (1) and (2) are satisfied, $$1.0 \leq ff2/f \leq 2.0 \tag{1}$$

$$-1.9 \leq ff2/ff3 \leq -1.3 \tag{2}$$

where f is the focal length of an entire lens system, and ff2 is the focal length of the second group lens, and ff3 is the focal length of the third group lens, wherein a diagonal angle of view of the wide-angle lens is 100° or greater.

2. The wide-angle lens according to claim 1, wherein the following conditional expression (3) is satisfied, $$0.5 \leq ff4/f \leq 2.0 \tag{3}$$

where ff4 is the focal length of the fourth group lens.

3. The wide-angle lens according to claim 1, wherein the second group lens is provided with a lens having an Abbe number of 40 or greater, and the third group lens is provided with a lens having an Abbe number of 35 or less.

4. An imaging device comprising:

the wide-angle lens according to claim 1; and an image pick-up device arranged in a focal position of the wide-angle lens.

* * * * *